United States Patent
Klopf et al.

(10) Patent No.: US 10,184,848 B2
(45) Date of Patent: Jan. 22, 2019

(54) SENSOR ARRANGEMENT FOR INDIRECT DETECTION OF A TORQUE OF A ROTATABLY MOUNTED SHAFT

(71) Applicant: Robert Bosch GmbH, Stuttgart (DE)

(72) Inventors: Frank Klopf, Munich (DE); Simon Schneider, Reutlingen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 15/538,728

(22) PCT Filed: Jan. 15, 2016

(86) PCT No.: PCT/EP2016/050747
§ 371 (c)(1),
(2) Date: Jun. 22, 2017

(87) PCT Pub. No.: WO2016/120095
PCT Pub. Date: Aug. 4, 2016

(65) Prior Publication Data
US 2017/0370789 A1     Dec. 28, 2017

(30) Foreign Application Priority Data
Jan. 29, 2015  (DE) .................. 10 2015 201 577

(51) Int. Cl.
*G01P 3/00* (2006.01)
*G01L 5/00* (2006.01)
(Continued)

(52) U.S. Cl.
CPC .............. *G01L 5/0019* (2013.01); *G01L 1/18* (2013.01); *G01L 3/108* (2013.01); *G01L 9/0052* (2013.01);
(Continued)

(58) Field of Classification Search
CPC ......... G01L 5/0019; G01L 1/18; G01L 3/108; G01L 9/0052; G01C 19/522; G01C 35/073; G01P 3/443
(Continued)

(56) References Cited

U.S. PATENT DOCUMENTS 6,053,834 A * 4/2000 Savoyard ................ F16D 49/12
188/77 W
6,851,497 B1 * 2/2005 Yoshiie .................... B62M 6/40
180/206.4
(Continued)

FOREIGN PATENT DOCUMENTS

DE      101 36 438 A1    3/2002
DE   10 2010 003 050 A1    9/2011
(Continued)

OTHER PUBLICATIONS

International Search Report corresponding to PCT Application No. PCT/EP2016/050747, dated Apr. 15, 2016 (German and English language document) (7 pages).

*Primary Examiner* — Max Noori
(74) *Attorney, Agent, or Firm* — Maginot, Moore & Beck LLP (57) ABSTRACT

A sensor arrangement for indirect detection of a torque of a rotatably mounted shaft includes a sensor with at least one sensor element arranged in the surroundings of a bearing of the shaft. The bearing is linked to a supporting structure. The sensor element is configured to detect a proportion of a bearing force acting in a predetermined direction. The torque of the shaft is configured to be calculated from the acting proportion of the bearing force. The sensor has at least one sensor body with an outer contour that supports a corresponding sensor element and is pressed into a receiving hole.

(Continued)

The sensor element has a predetermined distance and a predetermined angle to the bearing.

11 Claims, 8 Drawing Sheets

(51) Int. Cl.
| | | |
|---|---|---|
| *G01L 1/18* | (2006.01) | |
| *G01L 3/10* | (2006.01) | |
| *G01L 9/00* | (2006.01) | |
| *F16C 19/52* | (2006.01) | |
| *F16C 35/073* | (2006.01) | |
| *G01P 3/44* | (2006.01) | |

(52) U.S. Cl.
CPC .......... *F16C 19/522* (2013.01); *F16C 35/073* (2013.01); *G01P 3/443* (2013.01)

(58) Field of Classification Search
USPC .................................................. 73/862.322
See application file for complete search history.

(56) References Cited

U.S. PATENT DOCUMENTS

| | | |
|---|---|---|
| 2003/0233888 A1 | 12/2003 | Gierling |
| 2009/0097873 A1* | 4/2009 | Biegelsen ................ G01K 1/14 399/69 |
| 2014/0029879 A1 | 1/2014 | Brehm et al. |

FOREIGN PATENT DOCUMENTS

| | | |
|---|---|---|
| DE | 10 2010 027 010 A1 | 1/2012 |
| DE | 10 2012 200 232 A1 | 7/2013 |
| EP | 0 735 352 A2 | 10/1996 |
| EP | 1 696 216 A1 | 8/2006 |
| JP | 61-225630 A | 10/1986 |
| JP | 2002-541473 A | 12/2002 |
| JP | 2012-21783 A | 2/2012 |
| JP | 2014-202727 A | 10/2014 |
| WO | 2010/143285 A1 | 12/2010 |
| WO | 2010/144964 A1 | 12/2010 |

* cited by examiner

SENSOR ARRANGEMENT FOR INDIRECT DETECTION OF A TORQUE OF A ROTATABLY MOUNTED SHAFT

This application is a 35 U.S.C § 371 National Stage application of PCT/EP2016/050747, filed on Jan. 15, 2016, which claims the benefit of priority to Ser. No. DE 10 2015 201 577.7, filed on Jan. 29, 2015 in Germany, the disclosures of which are incorporated herein by reference in their entirety.

BACKGROUND

The disclosure is based on a sensor arrangement for indirect detection of a torque of a rotatably mounted shaft.

Sensors for detecting torque represent important components of engine and transmission test benches of all types. Moreover, they are an integral constituent part of many drive systems used in large-scale industry. With their aid, for example, the torques in ships' shafts, wind turbine systems or drilling rigs are monitored. Torque sensors are widespread but their comparatively complex structure and the costs associated therewith have previously prevented their use in mass-produced products. The measurement of the torque of the drive shaft of electric bicycles represents the first potential mass-market for torque sensors but the sensor concepts used for industrial systems are too expensive for this purpose.

In many test benches or calibration devices, the detection of the torque by means of a static transducer is sufficient. Here, the shaft whose torque is to be detected is connected to one side of a deformation element. The other end of the deformation element, also called a spring element, is connected to a stationary constructional element, such as a carrier or a housing part, for example. The applied torque leads to deformation of the spring element as a result of torsion. The resultant twisting is of a few degrees and can be detected by a multiplicity of known measuring methods. Here, above all, magnetic methods which detect the twist of a magnetic structure attached to the spring element relative to a stationary magnetic field sensor are usual. Optical methods are also suitable for this purpose.

Alternatively, it is possible to detect the material strains arising in the spring element on account of the deformation. Depending on the construction, these result from torsional torques or shear forces. To measure these material strains, bonded-on piezoresistive strain gauges, which are wired up to form a Wheatstone bridge, are generally used. Alternatively, these strains can also be detected by means of the magnetoelastic measuring principle. This is based on the fact that the permeability of ferromagnetic materials changes when material stresses are introduced. These changes can be detected without contact by a suitable sensor system, for example in the form of a structure comprising transmitter and receiver coils.

In most applications, the above-described static detection of the torque is not sufficient. Instead, it is necessary to determine the torque of rotating shafts. For this purpose, co-rotating sensors have been developed, which are integrated into the drive shaft and measure its torsion. This is normally carried out via one of the two above-described methods for determining the material strains caused by the torsion.

When strain gauges are used, the problem arises that neither the supply to the measuring bridge nor the signal pickup can be carried out via a cable connection in a rotating system. The supply is normally effected by the transmission of an alternating voltage by means of a transformer arrangement, in which a coil is wound around the drive shaft and consequently co-rotates. The other coil is stationary and surrounds the shaft at a somewhat greater distance. Together with the shaft, which acts as an iron core, the result is thus a transformer with comparatively good characteristics. Since the output signals of strain gauge bridges are relatively small, the signal evaluation and amplification are therefore carried out in the immediate vicinity of the measuring bridge by means of co-rotating electronics. The output signal from the latter can then, for example, be transmitted to the outside, i.e. to the stationary part of the sensor, by a transmitter coil and a receiver coil or by further electronics by means of a radio standard. Such sensors and all the components needed therefor are known from the prior art. They meet the requirements placed upon them but, as already explained above, require a high constructional outlay. In the co-rotating torque sensor area, magnetoelastic sensors have inherent advantages, since the measuring method used is non-contacting. The problem of making contact with rotating components is therefore not posed at all here, which is reflected in a lower constructional outlay.

Both with piezoresistive and with magnetoelastic sensors, the torques on rotating shafts can be measured very well. Their greatest advantage is the direct measuring principle. The torsion of the shaft detected by said sensors has a direct relationship with the torque. However, their greatest disadvantage also derives from this. The properties of shaft and sensor are inextricably connected with each other. The sensors cannot be applied to an existing shaft, since the elastic and/or magnetic properties of the shaft dominate the sensor characteristics. Instead, the torque sensors are themselves part of the shaft. Their specific requirements therefore have to be taken into account from the start during the construction of the entire drive train. A constructional solution that is found for one system cannot simply be transferred to another application. This leads to the situation in which, for example, the manufacturers of magnetoelastic sensors offer a total package comprising shaft (including all gears), integrated torque sensor and the necessary bearings. This integration represents a good solution primarily in manufacturing terms. However, it is likewise highly application-specific and can therefore be used for other applications only with difficulty or even not at all. As a result, the quantities and therefore the cost potentials for such solutions are limited by their nature.

As an alternative to direct measurement of the torque, it is possible to measure the forces arising during the transmission of the torque from one shaft to another shaft on the bearings thereof and to draw conclusions about the torque therefrom. This indirect approach is known from the prior art and is disclosed, for example, in the documents DE 10 2012 200 232 A1 and DE 10 2010 027 010 A1. However, these documents contain no kind of practical implementation with which the measurement of the bearing forces can be carried out.

SUMMARY

By contrast, the sensor arrangement according to the disclosure for indirect detection of a torque of a rotatably mounted shaft has the advantage that the torque of the shaft can be measured indirectly via the detection of the bearing forces of the shaft. For this purpose, piezoresistive sensor elements, which can be produced cost-effectively using thin layer technology, are preferably used. The at least one sensor element is incorporated into the supporting structure surrounding the bearing and detects the material strains or material compressions arising on account of the bearing forces. The individual sensor elements can be configured very compactly, miniaturized and produced very cost-effectively. Embodiments of the sensor arrangement according to the disclosure for indirect detection of a torque of a rotatably mounted shaft advantageously require only small constructional changes in the area of the bearings. The design of the shafts is not affected thereby. Therefore, the use of embodiments of the sensor arrangement according to the disclosure for indirect detection of a torque of a rotatably mounted shaft is in principle also possible in existing systems with only minor adaptations.

Embodiments of the present disclosure provide a sensor arrangement for indirect detection of a torque of a rotatably mounted shaft by using a sensor which comprises at least one sensor element arranged in the surroundings of a bearing of the shaft, said bearing being linked to a supporting structure, which sensor element detects a proportion of a bearing force acting in a predetermined direction, from which force the torque of the shaft can be calculated. According to the disclosure, the sensor has at least one sensor body with an outer contour, which sensor body supports a corresponding sensor element and is pressed into a receiving hole, wherein the sensor element is at a predetermined distance and a predetermined angle relative to the bearing.

By means of the measures and developments listed in the dependent claims, advantageous improvements of the sensor arrangement specified in the disclosure for indirect detection of a torque of a rotatably mounted shaft are possible.

It is particularly advantageous that the receiving hole for the corresponding sensor body can be introduced into the supporting structure. This means that the sensor body is pressed directly into the supporting structure. Alternatively, a housing which accommodates the sensor element can be pressed with its outer contour into a receiving hole introduced into the supporting structure. The receiving hole for the sensor body in this embodiment can be introduced into a support structure of the housing, wherein the housing is able to transmit the acting proportion of the bearing force via the support structure to the sensor body. In both cases, the material strains or material compression is/are transmitted to the sensor element and can be detected and output by the latter. It may be advantageous to provide at least one recess on the outer contour of the sensor housing, in the area of the sensor body, in order to achieve central introduction of the force onto the sensor body or the sensor element.

In a further advantageous configuration of the sensor arrangement according to the disclosure, the at least one sensor element can be implemented as a piezoresistive sensor element produced using thin layer technology, and have a metallic base, to which an insulating layer and a functional layer of piezoresistive materials are applied, wherein the functional layer has four resistor structures which are wired up to form a Wheatstone bridge. The material strains or material compression is/are transmitted to the piezoresistive sensor element and lead/leads to a change in the non-reactive resistances in the individual resistor structures. As a result of the change in the non-reactive resistances, the output voltage from the Wheatstone bridge changes. From this voltage signal, via a suitable evaluation electronics unit, conclusions can thus be drawn about the acting torque. The precise relationship between the signal from the measuring bridge and the bearing force proportional to the torque depends on the positioning of the sensor element in relation to the bearing. This places certain requirements on position and production tolerances but also opens up high degrees of freedom in the application. Thus, for example, with a sensor design conceived once, greater torques can also be measured if the sensor element is merely placed at a somewhat greater distance from the shaft than previously or at a different angle relative to the direction of the bearing force to be expected. Furthermore, multiple sensor elements can also be placed around the bearing, in order thus, for example, to monitor the direction of the bearing force of a shaft under changing conditions.

In a further advantageous configuration of the sensor arrangement according to the disclosure, the sensor can comprise at least two sensor elements, which are arranged at different positions in the surroundings of the bearing. The at least two sensor elements can have different detection directions and detect proportions of the acting bearing force acting in different directions. In addition, the detection directions of two adjacent sensor elements can extend substantially perpendicularly to each other. As a result, it is also possible to detect and calculate bearing forces the direction of which changes depending on the operating situation, such as for example in transmissions having multiple gears on one shaft. In order to determine magnitude and direction of the acting bearing force exactly, signals from the at least two sensor elements are evaluated appropriately. In addition, even with fixed transmission ratios, the useful signal can be separated better from interference variables. In order to be able to eliminate interference variables, such as transverse forces, on the bearing, or in order to obtain a redundant signal, the sensor can also be implemented with more than two sensor elements.

In a further advantageous configuration of the sensor arrangement according to the disclosure, the sensor can comprise at least one evaluation electronics unit, which can be connected electrically to at least one sensor element. The sensor elements are each connected, for example by wire bonding, to a circuit board, on which there is a suitable evaluation circuit.

Exemplary embodiments of the disclosure are illustrated in the drawings and will be explained in more detail in the following description. In the drawings, identical designations designate components or elements which implement identical or analogous functions.

DETAILED DESCRIPTION

Figure 1:
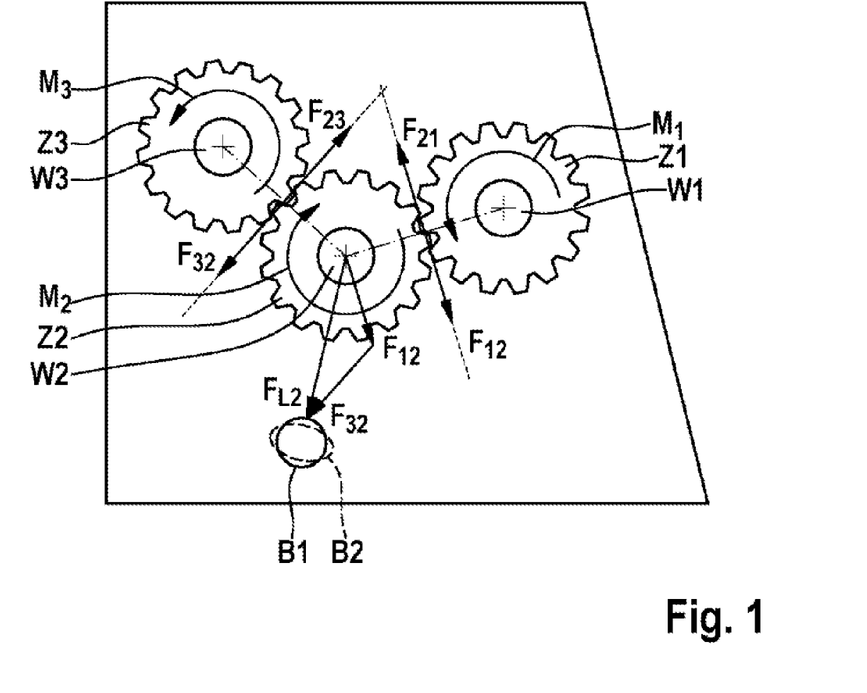
FIG. 1 shows a schematic illustration of a plurality of shafts and gears to illustrate the occurrence of bearing forces which can be detected by exemplary embodiments of the sensor arrangement according to the disclosure for indirect detection of a torque of a rotatably mounted shaft.

FIG. 1 serves to illustrate the occurrence of bearing forces. FIG. 1 shows multiple shafts W1, W2, W3, which are connected to one another by gears Z1, Z2, Z3. The arrangement serves to transmit a first torque M1 from a first shaft W1 via a second torque M2 of a second shaft W2 to a third shaft W3, which has a third torque M3. This is carried out by the gears Z1 and Z3 connected to the shafts W1, W3 via an intermediate gear Z2, which is connected to the second shaft W2. Here, two forces act on a bearing of the second shaft W2. Firstly, a force $F_{12}$ or $F_{21}$ acting at the point of contact between the first gear Z1 and the second gear Z2 also acts on the bearing of the second shaft W2, since the second gear Z2 is supported there via the second shaft W2. Secondly, the force $F_{32}$ or $F_{23}$ acting between the third gear Z3 and the second gear Z2 must be absorbed by the bearing. From the addition of these two forces $F_{L2}$ and $F_{32}$ the result is the bearing force $F_{L2}$ acting overall on the bearing of the second shaft W2. The bearing absorbs this force $F_{12}$ and passes it on to the surrounding structure. The resultant material stresses within this structure lead to material strains, which are proportional to the bearing force $F_{L2}$ and thus proportional to the torque M2. For this purpose, a hole B1 is introduced into the structure 3 surrounding the bearing 7, which hole is compressed by the force $F_{L2}$ illustrated in FIG. 1, according to the dashed illustration B2. These material stresses can be detected by means of a piezoresistive sensor element. Finally, by means of a suitable evaluation electronics unit, the torque M2 is determined therefrom.

As can be seen from FIGS. 2 to 14, illustrated exemplary embodiments of a sensor arrangement 1, 1A, 1B, 1C, 1D according to the disclosure for indirect detection of a torque of a rotatably mounted shaft 5 each comprise a sensor 10, 10A, 10B, 10C, 10D, which comprises at least one sensor element 30 arranged in the surroundings of a bearing 7 of the shaft 5, said bearing being linked to a supporting structure 3, which sensor element detects a proportion of a bearing force $F_L$ acting in a predetermined direction, from which force the torque of the shaft 5 can be calculated. According to the disclosure, the sensor 10, 10A, 10B, 10C, 10D has at least one sensor body 20 with an outer contour 24, which sensor body supports a corresponding sensor element 30 and is pressed into a receiving hole 12, 52.1, wherein the sensor element 30 is at predefined distance and a predefined angle relative to the bearing 7.

Figure 2:
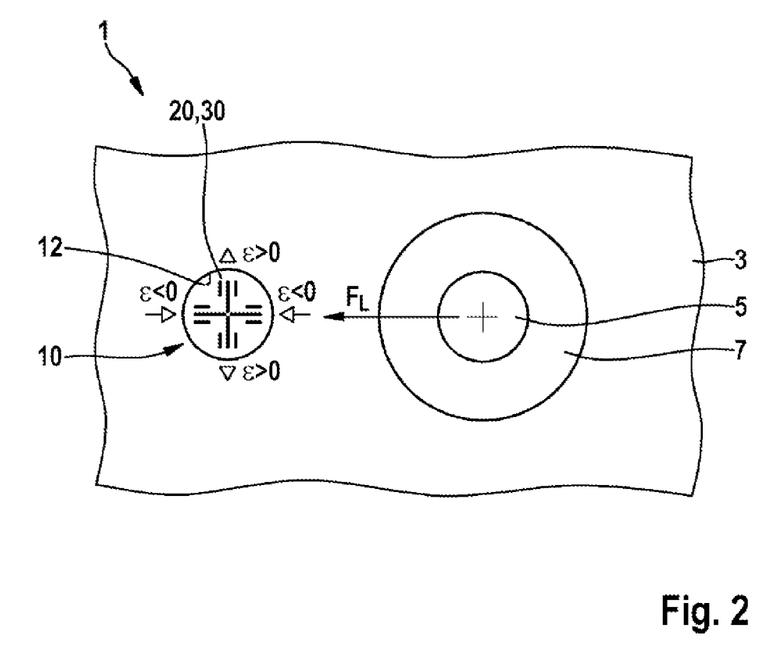
FIG. 2 shows a schematic illustration of a first exemplary embodiment of a sensor arrangement according to the disclosure for indirect detection of a torque of a rotatably mounted shaft.
Figure 3:
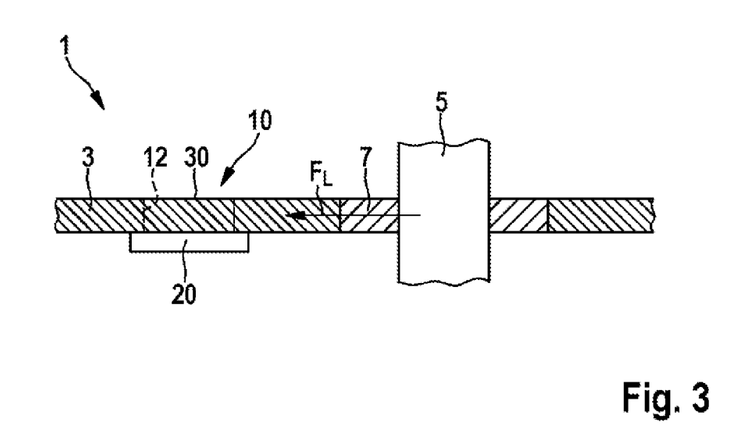
FIG. 3 shows a sectional illustration of the sensor arrangement according to the disclosure from FIG. 2.

As can be seen further from FIGS. 2 and 3, the illustrated first exemplary embodiment of the sensor arrangement 1 according to the disclosure has a sensor element 30, which is pressed into a receiving hole 12 of the supporting structure 3. In a way analogous to the hole B1 in FIG. 1, the receiving hole 12 in FIGS. 2 and 3 is also compressed in accordance with the force $F_L$ shown. In a first design variant, the sensor element 30 is pressed directly into the supporting structure 3 via the sensor body 20. In a second design variant, the sensor element 30 is pressed via the sensor body 20 into a support structure 52 of a sensor housing 50, 50A, which is in turn pressed into the receiving hole 12. In both cases, the compression is transmitted to the sensor element 30 and can be detected and evaluated by the latter.

The precise relationship between the output signal from the sensor element 30 and the bearing force $F_L$ proportional to the torque depends critically on the positioning of the sensor element 30. This places certain requirements on the position and manufacturing tolerances but also opens up high degrees of freedom in the application. Thus, for example, with a sensor design conceived once, greater torques can also be measured if the sensor element 30 is merely placed at a somewhat greater distance from the shaft 5 than previously or at a different angle relative to the direction of the bearing force $F_L$. As can be seen further from FIG. 4, multiple sensor elements 30 can also be placed around the bearing 7, in order thus, for example, to monitor the direction of the bearing force $F_L$ of the shaft 5 under changing conditions.

Figure 4:
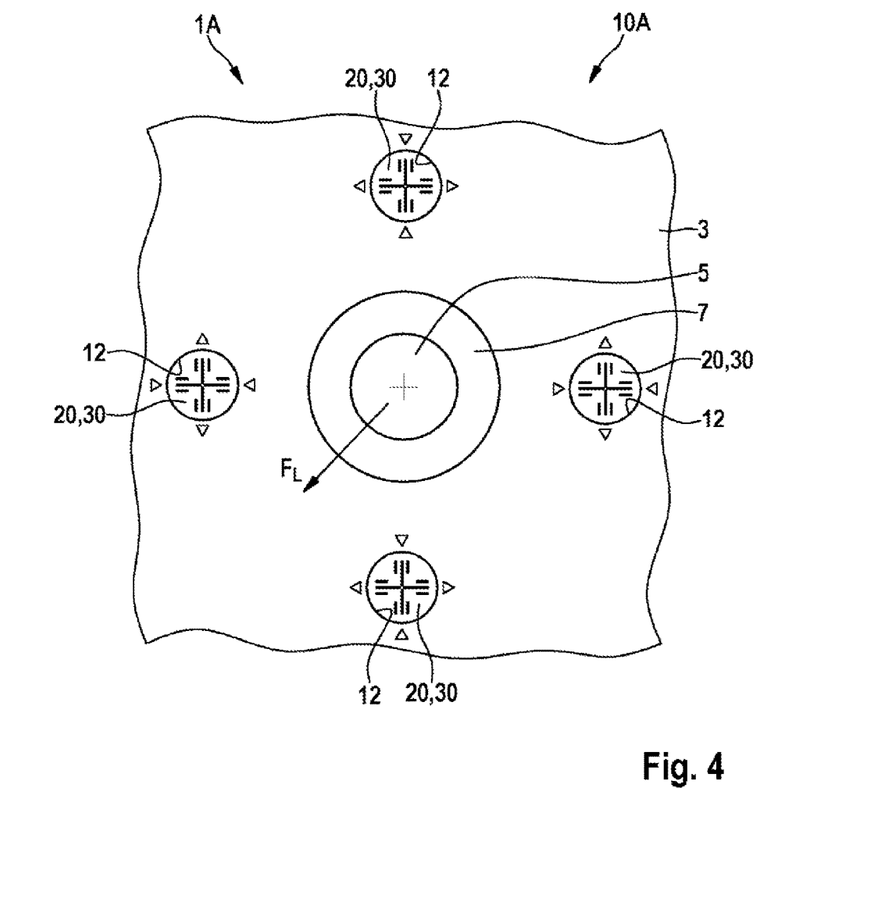
FIG. 4 shows a schematic illustration of a second exemplary embodiment of a sensor arrangement according to the disclosure for indirect detection of a torque of a rotatably mounted shaft.
Figure 5:
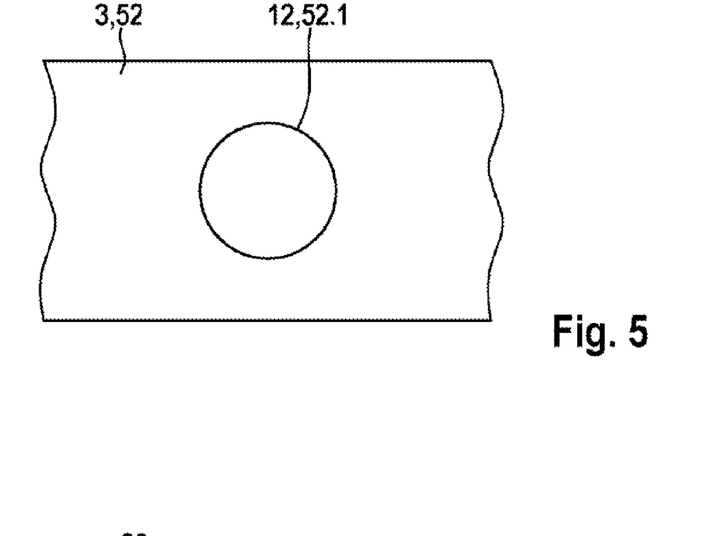
FIG. 5 shows a plan view of a receiving hole for a sensor body of a sensor element which can be used in exemplary embodiments of the sensor arrangement according to the disclosure for indirect detection of a torque of a rotatably mounted shaft.
Figure 6:
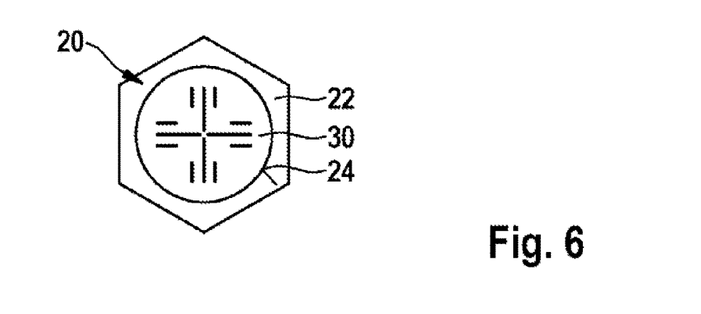
FIG. 6 shows a plan view of an exemplary embodiment of a sensor body having a sensor element which can be used in exemplary embodiments of the sensor arrangement according to the disclosure for indirect detection of a torque of a rotatably mounted shaft and can be pressed into the receiving hole from FIG. 5.
Figure 7:
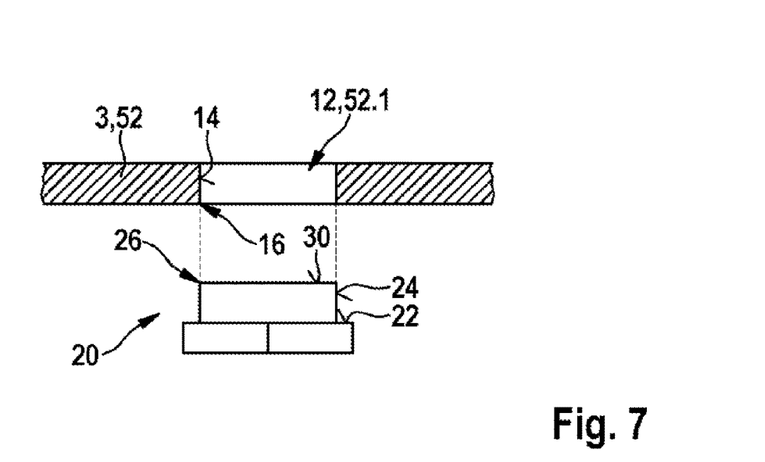
FIG. 7 shows a sectional illustration of the receiving hole from FIG. 5 and a sectional illustration of the sensor body from FIG. 6 before the operation of pressing the sensor body into the receiving hole.
Figure 8:
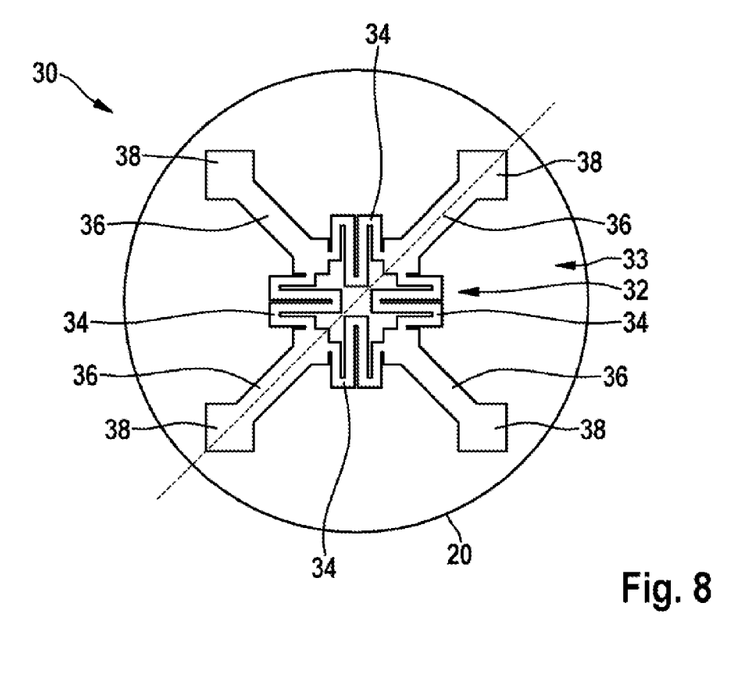
FIG. 8 shows a plan view of an exemplary embodiment of a sensor element which can be used in exemplary embodiments of the sensor arrangement according to the disclosure for indirect detection of a torque of a rotatably mounted shaft.
Figure 9:
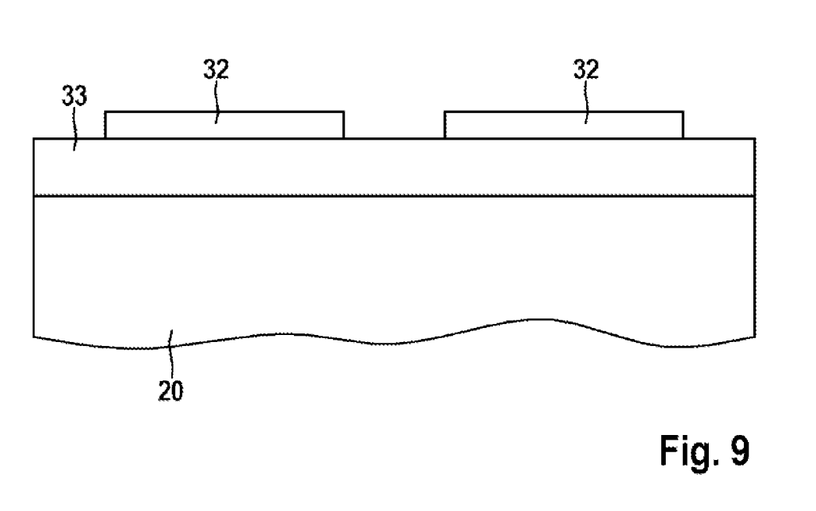
FIG. 9 shows a sectional illustration of the sensor element from FIG. 3.

As can be seen further from FIG. 4, the sensor 10A in the second exemplary embodiment of the sensor arrangement 1A according to the disclosure has multiple sensor elements 30. Here, a first sensor element 30 is arranged underneath the bearing 7 in the illustration and detects a proportion of the bearing force $F_L$ that acts downward. A second sensor element 30 is arranged on the left beside the bearing 7 in the illustration and detects a proportion of the bearing force $F_L$ that acts to the left. A third sensor element 30 is arranged above the bearing 7 in the illustration and detects a proportion of the bearing force $F_L$ that acts upward. A fourth sensor element 30 is arranged on the right beside the bearing 7 in the illustration and detects a proportion of the bearing force $F_L$ that acts to the right. From the detected proportions of the force, magnitude and direction of the acting bearing force can be determined. In addition, interference variables, such as transverse forces, on the bearing 7 can be eliminated, or a redundant signal can be generated.

As can further be seen from FIGS. 5 to 9, the sensor element 30 has a sensor body 20 made of steel, which has a highly precise outer contour 24 produced by turning, for example, which outer contour is suitable to be pressed into a correspondingly shaped inner contour 14 of the receiving hole 12, 52.1. In order to make the pressing-in operation easier, an insertion bevel 16, 26 can be formed respectively on the edge of the receiving hole 12, 52.1 and on the edge that is to be inserted of the sensor body 20. Underneath the highly precise round outer contour 24 there is a contour of any desired shape which can be used as a stop 22 during the pressing-in operation. In the exemplary embodiment illustrated, the contour is formed as a hexagon. Following the joining or pressing-in, the sensor element 30 can also be secured additionally by one or more spot welds.

On the steel sensor body 20 there is a thin layer which is composed at least of an insulating layer 33 (e.g. silicon oxide) and a functional layer 32. Piezoresistive materials, such as NiCr alloys, platinum, polysilicon, titanium oxynitride and so on can be used as functional layer 32. At least four resistors 34 are structured from the functional layer 32 by means of suitable methods such as, for example, wet etching, dry etching, laser ablation and so on, and are wired up to form a Wheatstone bridge. The resistor structures 34 are typically implemented in the form of meanders and arranged in such a way that they are sensitive in pairs to strains in spatial directions which are perpendicular to one another. Feed lines 36 to the bridge and contact-making surfaces 38 can be implemented in the plane of the functional layer 32 or in an additional metallization plane. In addition, the functional layer 32 can be protected by a passivation layer (e.g. silicon nitride) or other measures (e.g. gel coating).

Figure 10:
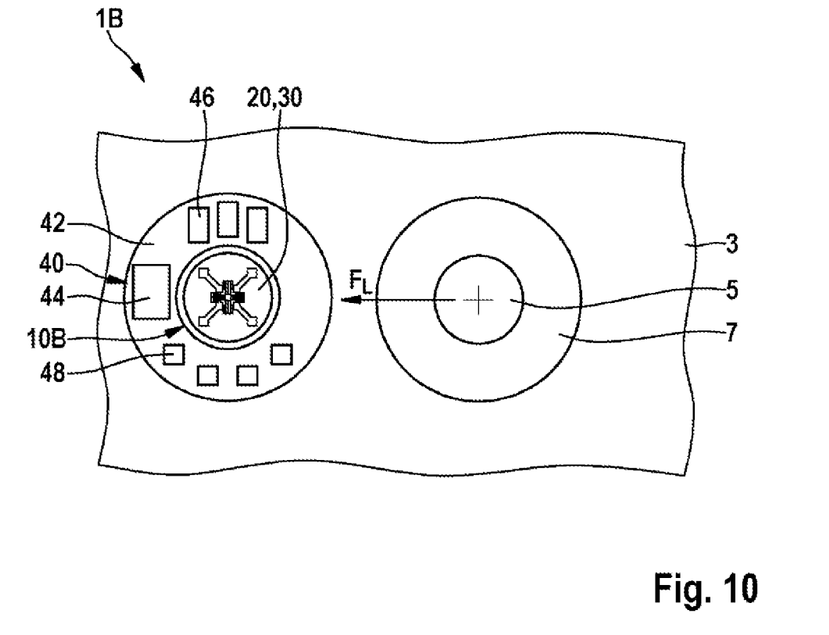
FIG. 10 shows a schematic illustration of a third exemplary embodiment of a sensor arrangement according to the disclosure for indirect detection of a torque of a rotatably mounted shaft.
Figure 11:
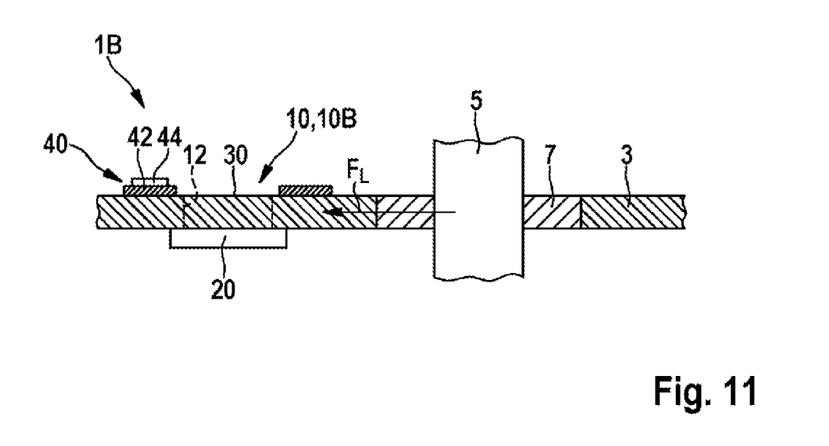
FIG. 11 shows a sectional illustration of the sensor arrangement according to the disclosure from FIG. 10.

As can be seen from FIGS. 10 and 11, the sensor 10B in the illustrated third exemplary embodiment of the sensor arrangement 1B according to the disclosure has a sensor element 30, the sensor body 20 of which is pressed directly into the receiving hole 12 of the supporting structure 3. In addition, the sensor 10B in the illustrated exemplary embodiment has no dedicated housing. The protection of the sensor elements 30 and an associated evaluation electronics unit 40 against environmental influences is ensured by the transmission housing, for example, which here also comprises the supporting structure 3. The protection of the sensor element 30 and of the evaluation electronics unit 40 against oil spray or abrasion can be carried out by means of a protective gel or a protective cap. The sensor element 30 is pressed via its sensor body 20 into the transmission housing or the supporting structure 3 within the transmission, in the vicinity of the bearing 7. Following the joining or pressing-in, the sensor element it can be secured additionally by one or more spot welds. The sensor element 30 detects the material strains arising on account of the bearing forces and converts said strains by means of the bridge circuit formed from resistor structures 34 into an output voltage. The sensor element 30 is connected, for example via wire bonding, to internal contact points 48 of a circuit board 42, on which there is a suitable evaluation circuit 44, which, for example, is implemented as an ASIC (application specific integrated circuit). The evaluation circuit 44 evaluates the bridge voltage and provides an output signal proportional to the torque in the form of a voltage (e.g. 0-5 V), a current (e.g. 4-20 mA) or in digital form. This signal can be picked up at external contact points 46, for example, by means of cables that are soldered on or plugged on. The power supply of the entire sensor 10B is likewise provided via these external contact points 48. Via the cables, the signal can be led to the outside or passed on to a control device likewise integrated in the transmission housing.

Figure 12:
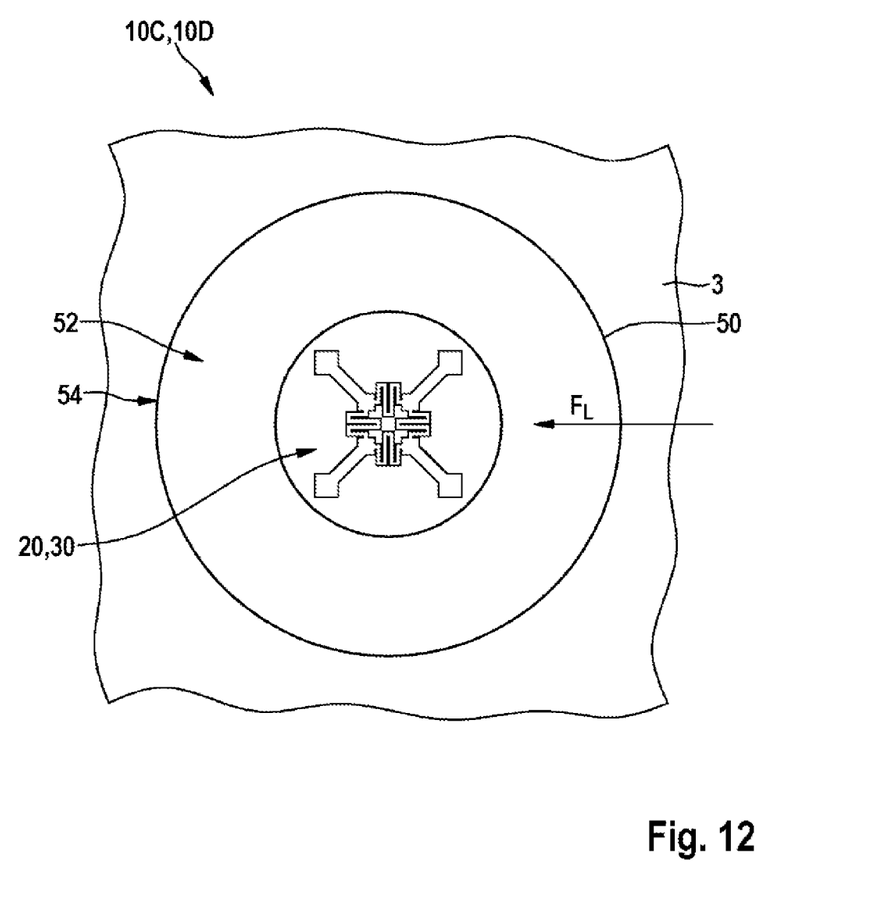
FIG. 12 shows a schematic plan view of an exemplary embodiment of a sensor for a sensor arrangement according to the disclosure for indirect detection of a torque of a rotatably mounted shaft.
Figure 13:
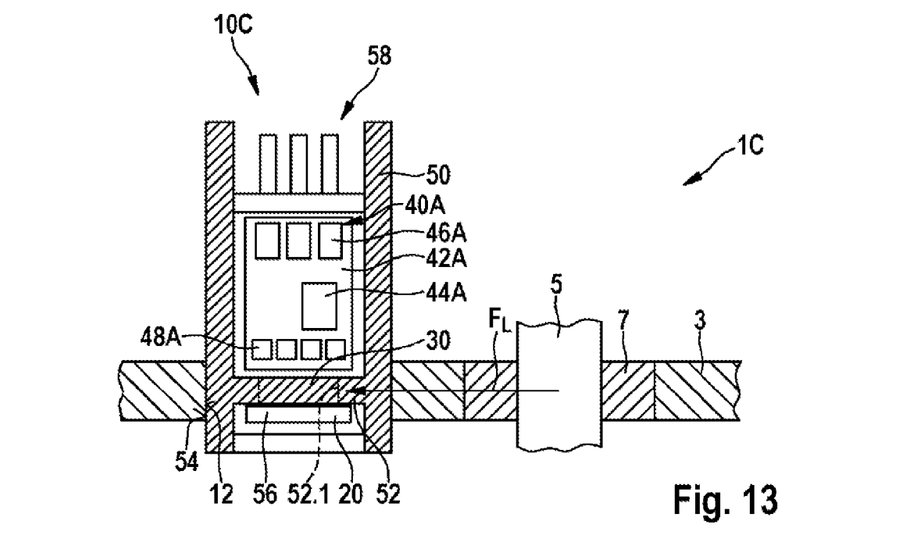
FIG. 13 shows a schematic sectional illustration of a fourth exemplary embodiment of a sensor arrangement according to the disclosure for indirect detection of a torque of a rotatably mounted shaft.
Figure 14:
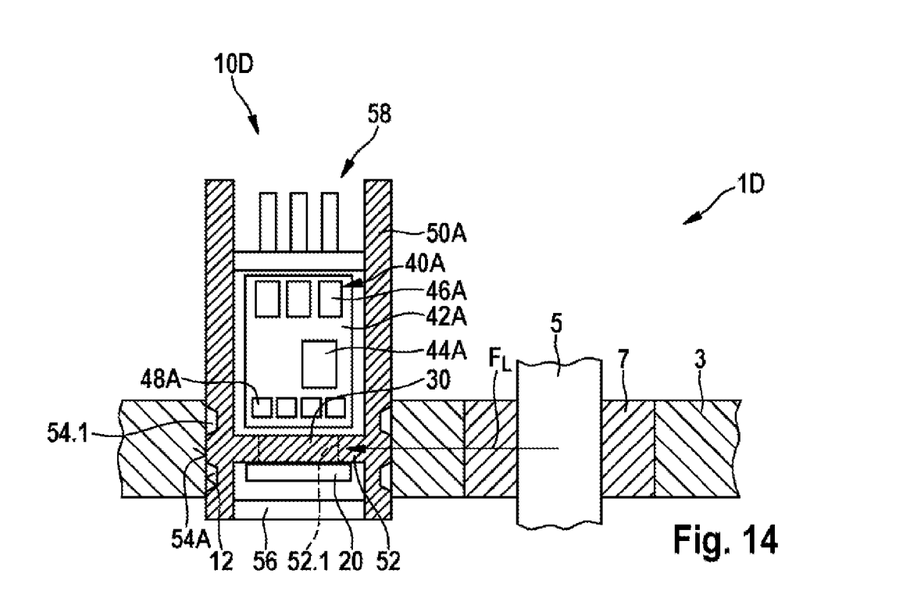
FIG. 14 shows a schematic sectional illustration of a fifth exemplary embodiment of a sensor arrangement according to the disclosure for indirect detection of a torque of a rotatably mounted shaft.

As can be seen from FIGS. 12 to 14, the sensor element 30 in the illustrated exemplary embodiments has a housing 50, 50A. The housing 50, 50A offers many advantages during application. In its press-in area, the housing 50, 50A is configured in such a way that lateral compressions are transmitted to the sensor element 30. The sensor element 30 is pressed via the sensor body 20 into a receiving hole 52.1 in a support structure 52 which runs radially relative to this part of the housing 50, 50A and therefore in the direction of the external force $F_L$. Following the joining or pressing-in, the sensor element 30 can additionally be secured by one or more spot welds.

In the area of the sensor element 30 and the support structure 52, the housing 50, 50A has a highly precise external contour 54, which is suitable for being pressed into a correspondingly configured receiving hole 12 of the supporting structure 3. The force-fitting connection produced in this way ensures that the compressions arising on account of the bearing force $F_L$ are transmitted via the sensor housing 50, 50A to the sensor body 20 and thus to the sensor element 30. As can be seen further from FIG. 14, the outer contour 54A the sensor housing 50A in the illustrated exemplary embodiment has multiple recesses 54.1 in the area of the sensor element 30, in order to achieve central introduction of the force $F_L$ onto the sensor element 30.

As can be seen further from FIGS. 13 and 14, there is relative freedom in the configuration of the rest of the housing 50, 50A. Care must merely be taken that no further forces are coupled into the signal path via the sensor housing 50, 50A, since this would lead to undesired cross-sensitivity of the sensor arrangement 1C, 1D. This is best achieved if there are no further points of contact between the sensor housing 50, 50A and other components. An introduction of force via the cabling is likewise to be avoided. As can be seen further from FIGS. 13 and 14, the housing 50, 50A in the illustrated exemplary embodiments is essentially composed of a steel sleeve, which is closed off on one side by a cover 56 and on the other side by a connector 58. Together with a suitable connector, such a construction can also be implemented in a hermetically sealed manner, so that use directly in the transmission oil becomes possible. The sensor element 30 converts the material strains into an output voltage in a way analogous to the exemplary embodiments already described, by means of the bridge circuit formed from the resistor structures 34. The signal evaluation is carried out in a manner analogous to the exemplary embodiments already described. In contrast to the third exemplary embodiment, in which the circuit board 42 is arranged substantially parallel to the supporting structure 3, in the fourth and fifth exemplary embodiment the circuit board 42A with the evaluation circuit 44A is arranged at right angles to the supporting structure 3 and within the housing 50, 50A. In a way analogous to the third exemplary embodiment, the sensor element 30 is, for example, connected electrically to internal contact points 48A, for example by wire bonding. The output signal from the evaluation circuit 44A can be output via the external contact points 46A and the connector 58.

Exemplary embodiments of the present disclosure provide a sensor arrangement for indirect detection of a torque of a rotatably mounted shaft which arrangement, advantageously, can be used everywhere where economical detection of the torque of drive shafts is required.

The invention claimed is:

1. A sensor arrangement for indirect detection of a torque of a rotatably mounted shaft, comprising:
   a sensor that includes at least one sensor element arranged in the surroundings of a bearing of the shaft, the bearing linked to a supporting structure, the at least one sensor element configured to detect a proportion of a bearing force acting in a predetermined direction, the torque of the shaft configured to be calculated from said proportion of the bearing force, wherein the sensor has at least one sensor body with an outer contour, the at least one sensor body supporting a corresponding at least one sensor element and being pressed into a receiving hole defined in the supporting structure such that at least a portion of the at least one sensory body is inside the supporting structure, and wherein the at least one sensor element is at a predetermined distance and a predetermined angle relative to the bearing.

2. The sensor arrangement as claimed in claim 1, wherein:
the receiving hole has a central axis extending in an axially direction of the receiving hole; and
the central axis of the receiving hole is parallel with the shaft.

3. The sensor arrangement as claimed in claim 1, wherein the at least one sensor element is accommodated in a housing, the housing having an outer contour that is pressed into the receiving hole defined in the supporting structure.

4. The sensor arrangement as claimed in claim 3, wherein the pressed-in outer contour of the housing has at least one recess.

5. The sensor arrangement as claimed in claim 3, wherein the receiving hole for the at least one sensor body is defined in a support structure of the housing, and wherein the housing transmits the proportion of the bearing force via the supporting structure to the at least one sensor body.

6. The sensor arrangement as claimed in claim 1, wherein the at least one sensor element is implemented as a piezoresistive sensor element configured using thin layer technology and has a metallic base to which an insulating layer and a functional layer of piezoresistive materials are applied, and wherein the functional layer has four resistor structures that are wired up to form a Wheatstone bridge.

7. The sensor arrangement as claimed in claim 1, wherein the sensor comprises at least two sensor elements arranged at different positions in the surroundings of the bearing.

8. The sensor arrangement as claimed in claim 7, wherein the at least two sensor elements have different detection directions and detect proportions of the bearing force acting in different directions.

9. The sensor arrangement as claimed in claim 8, wherein the detection directions of two adjacent sensor elements of the at least two sensor elements extend substantially perpendicularly to each other.

10. The sensor arrangement as claimed in claim 1, wherein the sensor comprises at least one evaluation electronics unit connected electrically to at least one sensor element.

11. A sensor arrangement for indirect detection of a torque of a rotatably mounted shaft, comprising:
a sensor that includes at least one sensor element arranged in the surroundings of a bearing of the shaft, the bearing linked to a supporting structure, the at least one sensor element configured to detect a proportion of a bearing force acting in a predetermined direction, the torque of the shaft configured to be calculated from said proportion of the bearing force, wherein the sensor has at least one sensor body with an outer contour, the at least one sensor body supporting a corresponding at least one sensor element and being pressed into a receiving hole defined in the supporting structure such that at least a portion of the at least one sensory body is inside the supporting structure, wherein the at least one sensor element is at a predetermined distance and a predetermined angle relative to the bearing, wherein the at least one sensor element is accommodated in a housing, the housing having an outer contour that is pressed into the receiving hole defined in the supporting structure, and wherein the receiving hole for the at least one sensor body is defined in a support structure of the housing, and wherein the housing transmits the proportion of the bearing force via the supporting structure to the at least one sensor body.

* * * * *